United States Patent [19]
Frykhult

[11] Patent Number: 4,814,093
[45] Date of Patent: Mar. 21, 1989

[54] ROTATABLE FILTER ASSEMBLY AND METHOD OF OPERATING SAME

[75] Inventor: Rune H. Frykhult, Stockholm, Sweden

[73] Assignee: Celleco AB, Stockholm, Sweden

[21] Appl. No.: 96,467

[22] Filed: Sep. 15, 1987

Related U.S. Application Data

[63] Continuation of Ser. No. 563,861, Dec. 21, 1983, abandoned.

[30] Foreign Application Priority Data

Dec. 22, 1982 [SE] Sweden ................................ 8207320
Mar. 25, 1983 [SE] Sweden ................................ 8301652

[51] Int. Cl.$^4$ ..................... B01D 33/26; B01D 33/38; B01D 33/40
[52] U.S. Cl. ................................... 210/780; 210/327; 210/331; 210/347
[58] Field of Search ............... 210/780, 784, 327, 331, 210/334, 346, 345, 404, 347

[56] References Cited

U.S. PATENT DOCUMENTS

| | | | |
|---|---|---|---|
| 2,022,069 | 11/1935 | Whitmore | 210/784 |
| 2,894,632 | 7/1959 | Myers | 210/331 |
| 3,471,026 | 10/1969 | Riker | 210/334 |
| 3,471,027 | 10/1969 | Emilsson | 210/331 |
| 3,591,009 | 7/1971 | Luthi | 210/331 |
| 3,659,716 | 5/1972 | Peterson et al. | 210/331 |
| 4,056,473 | 11/1977 | Nilsson | 210/331 |
| 4,136,028 | 1/1979 | Toivonen | 210/780 |
| 4,157,301 | 6/1979 | Wegener | 210/404 |
| 4,678,575 | 7/1987 | Frykhult | 210/346 |

Primary Examiner—Richard V. Fisher
Assistant Examiner—Linda S. Evans
Attorney, Agent, or Firm—Cyrus S. Hapgood

[57] ABSTRACT

A rotatable filter assembly comprises a rotor in a container for fibre suspension. The center of the rotor is formed by axial discharge tubes into which hollow filter elements, forming annular filter discs open. A collecting hopper extends into the center of the filter assembly. The filter elements keep separately, at least during part of the rotation turn, a lower pressure inside than outside. The filter assembly is characterized in that each of the axial discharge tubes (6) is permanently connected to its own accumulator chamber (9) for filtrate, which is provided to keep during a first part (16) of the rotation turn of said drum (4) such a pressure, preferably atmospheric pressure, that filtrate is caused to accumulate in the accumulator chamber (9), and that during a second part of the rotation turn of the drum (4) the accumulator chamber is caused to communicate with a device for filtrate discharge (11, 26) which is dimensioned to discharge the filtrate from tube and accumulator chamber during this second part of the rotation turn.

20 Claims, 6 Drawing Sheets

ROTATABLE FILTER ASSEMBLY AND METHOD OF OPERATING SAME

This application is a continuation of my copending application Ser. No. 563,861 filed Dec. 21, 1983, (now abandoned), and claiming priority based upon Swedish applications No. 8207320-6 filed Dec. 22, 1982, and No 8301652-7 filed Mar. 25, 1983.

BACKGROUND OF THE INVENTION

The present invention relates to a rotatable filter assembly, primarily intended for separation of fibres from a fibre suspension, which comprises a plurality of annular filter discs, formed by filter elements, which are mounted axially spaced, substantially parallel, on a horizontal drum, rotatable in bearings, driven by a motor, in a container for a fibre suspension that is to be separated, each filter element being formed by a hollow body, with walls made from straining cloth, which body communicates via a filtrate outlet, provided at the radially inner end, with an axial discharge tube in the drum, which is formed like a cylindrical drum with a grating-formed mantle wall, containing axial tubes, which form the discharge tubes, which communicate with the filter elements, a collecting hopper extending into the drum through one open end of it, with its opening, turned upwards, along all filter discs, carried by the drum, the interior of each filter element being kept, separately, at a pressure lower than that prevailing at the outside of it during at least part of the rotation of said drum.

Such filter assemblies are known from Swedish patent specification No. 7406315-7 and Swedish patent application No. 301082-7, the latter of which discloses a further development of the filter assembly, which is related to in the specification. For both types of filter assemblies it applies that there must be provided a subpressure within the filter elements during a certain part of the rotation turn of the filter assembly, whilst this subpressure shall be brought to cease during the rest of the rotation turn, that is to say during the so called taking off zone. Conventionally the subpressure is provided by the aid of an external vacuum source, that is to say a vacuum pump or a so called barometric leg, the communication between the discharge tubes and the vacuum source being provided by a valve or lock device. As vacuum pumps are expensive in installation and operation, normally barometric legs are used. In order to give a sufficient subpressure the barometric legs must be 6–9 meters long from the centre of the filter and furthermore they must be straight in order to operate. Furthermore, they only operate optimally at a certain flow rate. If the production rate is changed from the calculated one a lower subpressure or no subpressure at all is obtained. A further drawback with barometric legs is that a large amount of air is mixed into the filtrate when using them, which is unfavourable in a production process. According to the present invention this drawback is reduced.

SUMMARY OF THE INVENTION

The object of the present invention is to provide a rotatable filter assembly of the art mentioned introductorily, comprising a simple device for filtrate discharge, no vacuum pump or barometric leg of a length hitherto necessary is needed, or can be left out completely. The filter assembly shall also permit a high speed of rotation and thus also a high capacity.

According to the invention, each of said axial tubes is permanently connected to its own accumulator chamber for filtrate and thus forms the main portion of a discharge tube including said chamber. This chamber, during a first part of the rotation turn of said drum, is provided with such a pressure (preferably atmospheric pressure) that the filtrate is caused to be collected in the accumulator chamber. During a second part of the rotation turn of said drum, said accumulator chamber is arranged to communicate with a device for filtrate discharge, which is dimensioned to discharge filtrate from the main tube portion and accumulator chamber during this second part of the rotation turn.

The idea is thus that the accumulator chambers are filled completely with filtrate before a corresponding filter element comes into such a position that the accumulator chamber is brought to communicate with a device for filtrate discharge, which is dimensioned and arranged in such a way that the filtrate is quickly discharged through same.

According to the invention a rotatable filter assembly is obtained, which can be operated at a high rotation rate and corresponding high capacity. As the device for filtrate discharge does not need to be provided with a discharge pipe with as long a length as that of the hitherto used barometric legs, the pump work is reduced considerably, which means reduced operation costs. The largest field of use for a rotatable filter assembly according to the invention is within the cellulose and paper industry.

The reason for the quick discharge is that part of the filtrate quantity is accumulated in the accumulator chambers, so that there is no need to transport this amount axially at the discharge. This amount of liquid, which is then discharged, in turn suctions filtrate in the axial tubes and the filter elements with itself.

If barometric legs shall be eliminated or be shortened considerably, the total inner volume of the filter elements and the axial tubes must be made several times bigger compared with the total corresponding volume of known filter types; that is to say, the filtrate has to be accumulated in said parts, thereupon to be "tipped over" into a device for filtrate discharge, which then in this position shall stand under water lock, an inner subpressure thus being created. For several reasons it is not suitable to increase the volume of the filter elements, and then it only remains to increase the volume of the axial channels. If these would be increased substantially, there will arise the problem that the openings, which the removed mass cake has to pass on its way from the filter element down to the discharge conveyor screw will be too small, so that a mass will clog in these openings. (This problem is also relevant for a filter assembly with the tubes arranged in groups.) With the design according to the present invention this problem has been eliminated.

Practical tests performed with a fibre mass suspension of ground pulp, which is common pulp, have shown that it is suitable if an accumulator chamber has a volume which is about 40% of the volume of the axial tube portion with which it is connected. "Volume" here means the maximal volume, which is available for the filtrate. Of course the axial tube portions are dimensioned considering the actual filtrate flow. If the accumulator chambers show a volume of 40% of the other tube volume, it has become obvious that an optimal subpressure is obtained in the filter elements. Tests showed that already at a volume of 15% an effect of the accumulator chamber could be measured.

In other tests with fibre mass suspensions of other grades, (long fibre kraft pulp) an optimal result has been obtained when the accumulator chamber has a volume of 5-10 times the volume of the axial channels (in some single case even larger accumulator chambers have given optimal results).

The system with accumulator chambers has also proved to give great economic advantages, as the discs and the axial tube portions can be standardized for instance in 3 or 4 sizes, and the differences in filtrate amounts can be accommodated by the accumulator chambers. The variation in filtrate flow may for a given filter assembly size arise up to about 1:20 (if a suspension that is difficult to dewater is compared with one that is extremely easily dewatered). In the manufacture, the costs will be much lower, if discs and elements are standardized, as special tools can then be provided. Discs and axial tubes are produced in large series and are stored, and after reception of orders the accumulators are manufactured from case to case.

The accumulator chambers are suitably connected as extensions of the main or axial portions of the tubes. Radially the accumulator chambers can be connected to the axial tube portions outside or inside of same or partly outside and partly inside.

The device for filtrate discharge consists, in a suitable embodiment of the invention, of a chamber arranged radially inside of the accumulator chambers and communicating with same through a sliding coupling. It is suitable to provide the sliding coupling axially on the same level as the radial inner parts of the accumulator chambers. Another embodiment has the sliding coupling arranged axially outside of the accumulator chambers. The device for filtrate discharge is suitably provided with at least one discharge pipe, opening in a filtrate container. The distance from the center of the filter drum to the level in the filtrate container should normally be about 2.5-3.5 m. The discharge pipe must not be dimensioned for a certain flow rate but only regarding the maximal filtrate flow rate. There is no need that such a pipe be straight, which means a more free placing.

As it may be an advantage in certain applications to divide the filtrate into two separate flows, of which the first one is normally circulated, it is suitable if the device for filtrate discharge consists of two chambers arranged one after the other (as seen in the direction of rotation of said drum) and provided with separate discharge pipes.

In one special embodiment, the accumulator chambers communicate with a suction channel which is arranged to open, during part of the rotation turn of said drum, with its free end under a liquid surface created by outgoing filtrate, so that a subpressure is formed in the corresponding accumulator chamber, axial tube portion and filter element during said part of the rotation turn.

In one suitable embodiment, the accumulator chambers are designed with an elongated form, with their outlet in the rear part, seen in the direction of rotation of said drum. Thus the rotating filter assembly will be self-uptaking, that is to say, a mass cake will be suctioned to the filter elements even at a low level of suspension in the filter container.

In certain applications it can be an advantage, considering the possibility to remove the filter cake from the filter element, if during a third part of the rotation turn of said drum, said accumulator chamber is arranged to communicate with a connection to a pressure, which is higher than atmospheric pressure.

In one especially advantageous embodiment of the filter assembly, the tubes are arranged in groups, as is disclosed in the Swedish patent application No. 8301082-7. Thus an extremely high rotation rate is permitted for the filter assembly. Two different variants of this embodiment are conceivable. Thus each second tube can be circumferentially retracted, seen in the direction of rotation of the drum, or each second tube is displaced forwardly. In these two cases groups are considered, each consisting of two groups. In the embodiment with each second tube retracted, optimal dewatering of the filter cake is obtained if the total volume of each circumferentially displaced tube and its communicating filter element and accumulator chamber is smaller than the total volume of the non-displaced tube, grouped with the displaced tube, and the filter element and accumulator chamber communicating with the non-displaced tube.

Different arrangements are conceivable for facilitating the removal of the filter cake from the filter elements. One suitable device comprises two nozzles for high pressure water or pressurized air, provided on each side of each disc in the removal zone, arranged circumferentially after each other. The rear nozzle, as seen in the direction of rotation, can be arranged to act intermittently and preferably with a frequency that corresponds to the frequency of passing tubes or groups of tubes, whilst the other nozzle is provided with a continuous function. In some cases it may be suitable if both nozzles are operating intermittently, preferably simultaneously. The rear nozzle is suitably directed in the direction of rotation.

DESCRIPTION OF THE DRAWINGS

The invention shall now be described more in detail, reference being made to the accompanying drawings, in which.

DESCRIPTION OF PREFERRED EMBODIMENTS

Figures 1, 2:
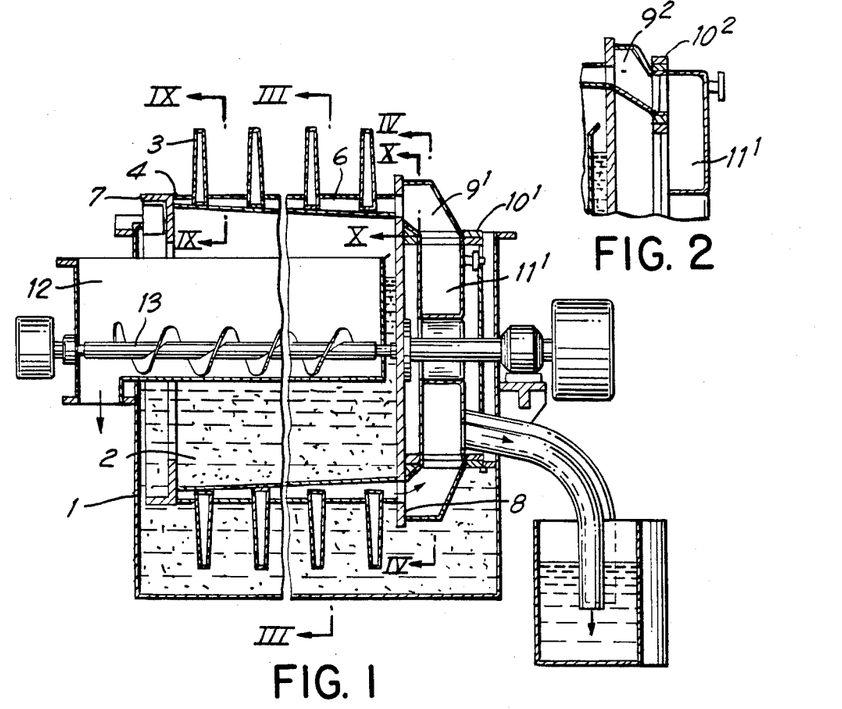
FIG. 1 shows a rotatable filter assembly, in longitudinal sectional view.
FIG. 2 shows a detail from FIG. 1, as alternative embodiment.

In FIG. 1 a container for fibre suspension is marked by 1 and a rotatable horizontal filter rotor by 2, partly submerged in the container. The filter rotor 2 is formed by a plurality of annular filter discs 3, which are mounted substantially parallel on a horizontal drum 4, driven by a motor. The filter discs 3 are composed of a number of separate filter elements 5, each of which is formed as a hollow body with walls made from straining cloth, which body communicates via a filtrate outlet, provided at the radially inner end, with an axial discharge tube 6.

The drum 4 is thus formed by the axial tubes 6 and gable parts 7 and 8. The axial tubes are each permanently connected to one separate accumulator chamber $9^1$ which in turn, via a sliding coupling $10^1$, is connected to a stationary device for filtrate discharge $11^1$. In FIG. 1 the sliding coupling $10^1$ is shown cylindrical and rotationally symmetric; but it can also, as is shown in FIG. 2, be formed as a plane sliding coupling $10^2$ which connects an accumulator chamber $9^2$ to a device for filtrate discharge $11^1$.

Figure 3:
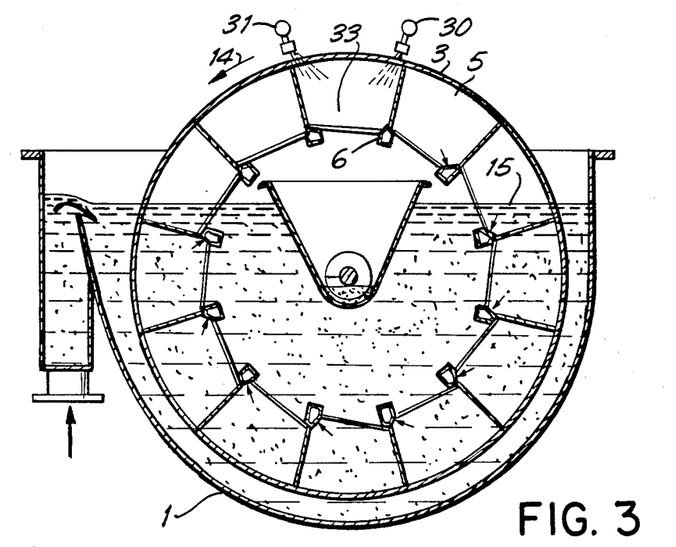
FIG. 3 shows a view in direction III—III in FIG. 1.

The filter rotor can be brought to rotate by a motor, which is not shown, in a way known per se. A collecting hopper 12 extends into the drum 4 through the open end of the latter, with its opening turned upwards, along all filter discs 3 carried by the drum 4. The collecting hopper 12 is provided with a conveyor screw 13. The filter rotor rotates in a direction, which is indicated by an arrow 14 in FIGS. 3 and 4 and the level of the fibre suspension in the container 1 is given by number 15. Nozzles for removal of filter cake are numbered 30 and 31.

For optimal function of a rotatable filter assembly of the type shown, there should be a subpressure acting upon the inner side of the filter element 5 during a certain part of the rotation turn and less than the hydrostatic pressure acting upon the filter element 5 below the level 15.

Figure 4:
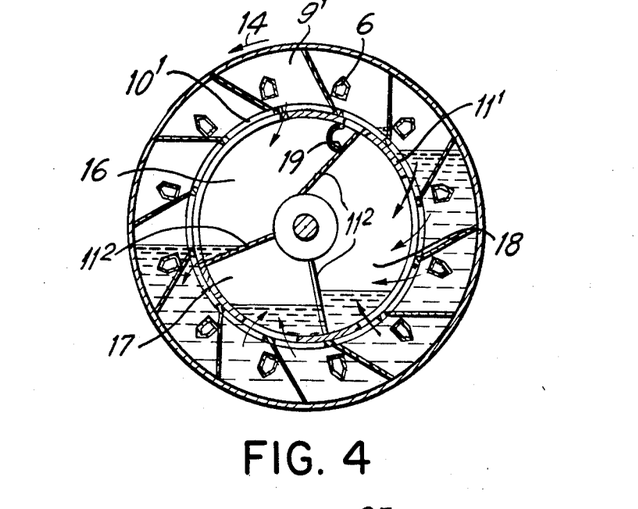
FIG. 4 shows a view in direction IV—IV in FIG. 1.

As is obvious from FIG. 4, the device for filtrate discharge $11^1$ is divided into four zones, 16, 17, 18 and 19. Zone 16 communicates with the atmosphere via a pipe 20 (see FIG. 5), zone 17 is a first subpressure zone where the subpressure is provided by communication with a discharge pipe 21 opening in a filtrate container 22. The filtrate from this zone is normally recirculated. Zone 18 is a second subpressure zone where the subpressure is provided by communication with a discharge pipe 23 to a filtrate container 24. The filtrate in this container is more pure than that in the filtrate container 22 and is normally called "clear filtrate". Zone 19 communicates via a connection 25 to a source to overpressure and has as an object to provide an overpressure in the filter elements in order that the mass cakes shall be removed quickly from the filter elements. In some cases there is only one subpressure zone needed, and even the overpressure zone can sometimes be left out.

Figure 6:
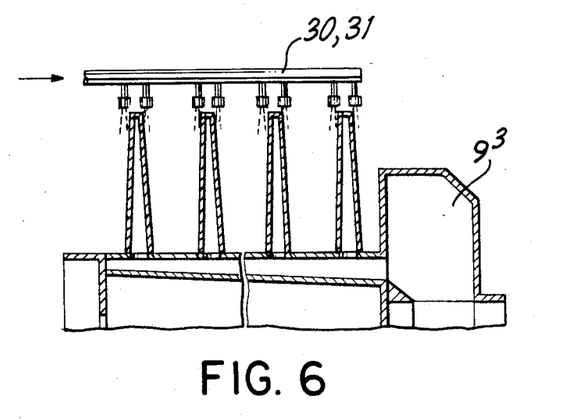
FIGS. 6, 7 and 8 show some alternative embodiments of accumulator chambers, in longitudinal sectional view.

In FIG. 6, an embodiment of the accumulator chamber $9^3$ is shown in which the chamber is located, radially seen, outside of the axial tubes. This embodiment gives the highest capacity when the filter is used for dewatering.

Figure 7:
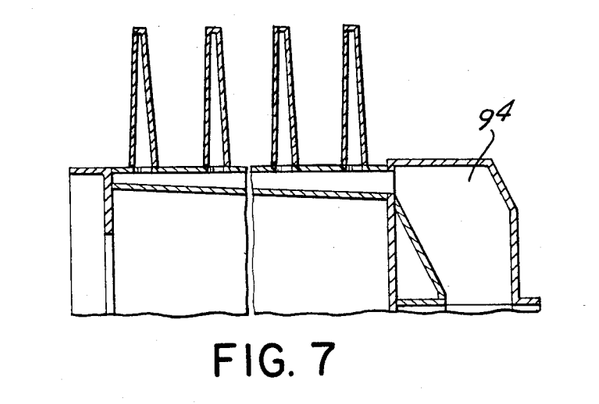
Figure 8:
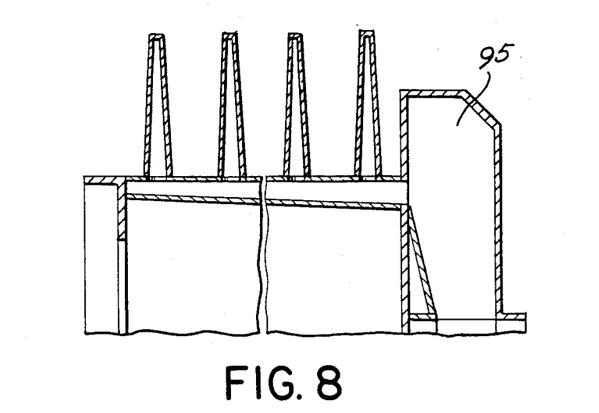

In FIG. 7 there is shown one embodiment in which the accumulator chamber $9^4$ is substantially placed—radially seen—inside of the axial tubes. This embodiment gives the lowest fibre losses when the filter is used for fibre recovery. In FIG. 8 there is shown one embodiment where the accumulator chamber $9^5$—radially seen—is placed as well inside as outside of the tubes. This embodiment is used in special cases.

Figure 9:
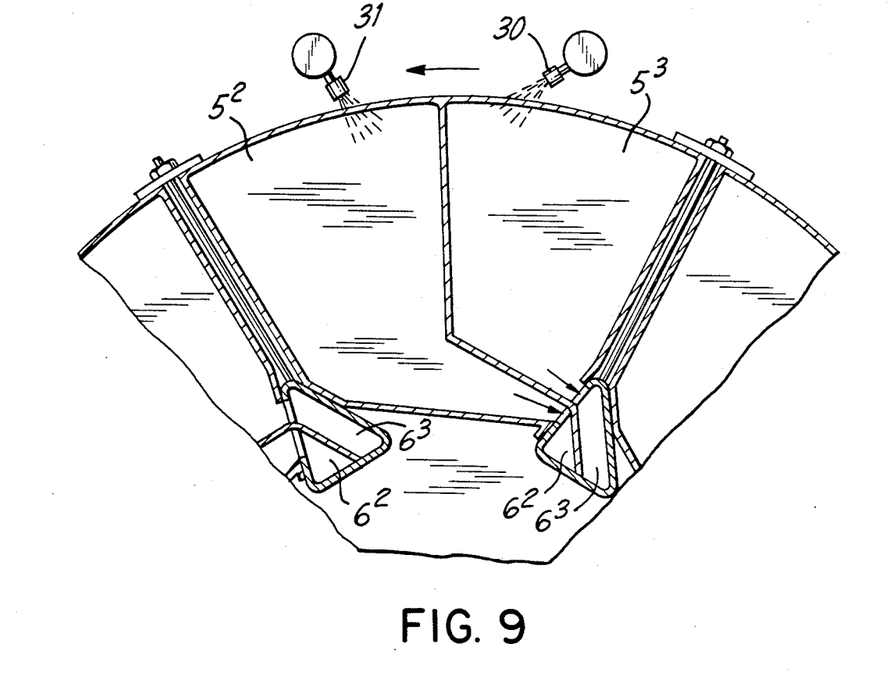
FIG. 9 shows a view in direction IX—IX in FIG. 1, in an embodiment with the axial tubes in groups of two, in an enlarged scale compared with FIG. 1.
Figure 10:
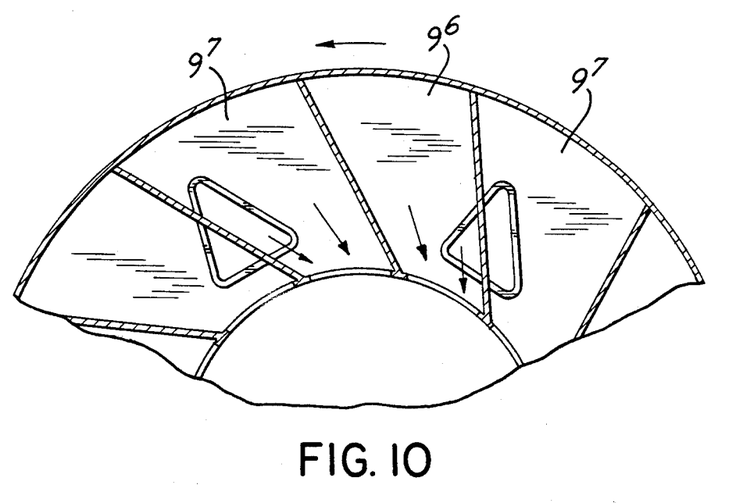
FIG. 10 shows a view in direction X—X in FIG. 1, in the same embodiment as in FIG. 6.

In FIGS. 9 and 10 an embodiment is shown in which every second axial tube is retracted, that is to say, where the axial tubes are arranged in groups of two. The filter elements are marked $5^2$ and $5^3$ and the axial tubes $6^2$ and $6^3$ whilst the accumulator chambers connected to the tubes are marked $9^6$ and $9^7$.

As the displacement of the axial tubes means that the hydrostatic pressure difference on the downgoing side of the filter elements will be somewhat smaller over the strainer cloth on those filter elements which communicate with the displaced axial tubes, this drawback can be eliminated by forming the total volume of the filter elements, the axial tube portions and the accumulator chambers (V $5^2$+V $6^2$+V $9^6$) somewhat smaller for those axial tubes.

Figure 11:
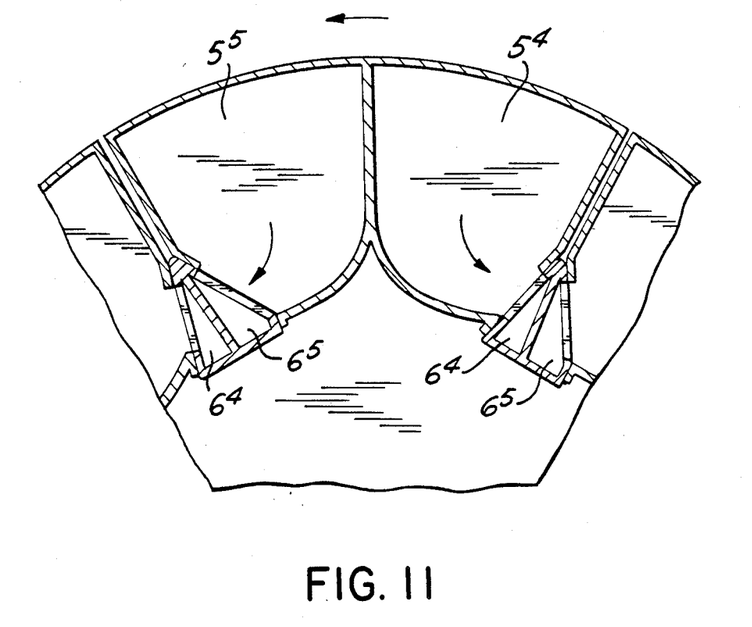
FIG. 11 shows an alternative of the embodiment in FIG. 9.

An alternative embodiment with the tubes arranged in groups is shown in FIG. 11 where—seen in the direction of rotation—every second axial tube is displaced forwardly. In this way a first filter element $5^4$ will communicate with a first axial tube $6^4$ which is situated, as seen in the direction of rotation of drum 4, after this first filter element or in the rear part of this; whilst a second filter element $5^5$, as seen in the same way, after the first filter element, in succession of it, communicates with a second axial tube $6^5$, arranged in group with the first tube.

This embodiment, comprising said arrangement of the axial tubes and the accumulator chamber, has proved to be especially advantageous, as such a rotatable filter assembly can be driven at an extremely high rate of rotation, still giving a high dry concentration of the outgoing fibre mass.

Figure 12:
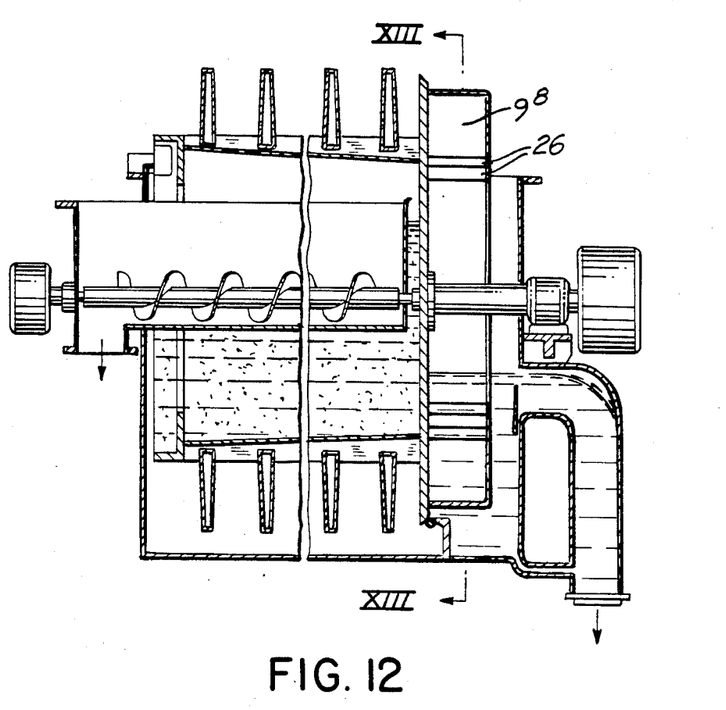
FIG. 12 shows, in a longitudinal sectional view, an embodiment with a device for filtrate discharge comprising suction channels.

In FIG. 12 an embodiment of the new rotatable filter assembly is shown with an alternative form of the device for filtrate discharge. The accumulator chamber $9^8$ is suitably formed according to FIG. 6, but the subpressure is there created in such a way that every accumulator chamber communicates with its discharge tube, suitably one suction channel 26, bent backwards in the direction of rotation. The opening 27 of this suction channel is in some positions during the rotation under water lock (the liquid surface is marked 28), which causes a subpressure to be created in the accumulator chamber and in the axial tube portions and filter elements communicating with same. The volume of the accumulator chamber $9^8$ is dimensioned in the way previously described. The suction channel 26 can be designed as a plurality of embodiments. In all these the opening of the suction channel in certain positions is under a water lock.

A filter assembly according to FIGS. 1–5 operates in the following way: When—during the rotation—a filter element 5 turns down in the suspension, it is successively filled up inside with filtrate and on the outside of the element there is formed a mass cake. The filtrate also successively fills the space within the axial tube portions 6 and the accumulators 9, before these are brought to communicate with the first subpressure zone 17 of the device for filtrate discharge. When this communication is in action, filtrate is discharged from the filter elements 5 via the axial tube portions 6 and the accumulators 9 through zone 17 and the discharge pipe 21 to the filtrate container 22. The function when communicating with zone 18 is analogous. At the then following communication with the connection for overpressure 25, the filter elements 5 are subjected to inner overpressure, and the mass cakes loosen quickly to fall via the opening 33 down into the outlet hopper 12 and are discharged by the conveyor screw 13.

The function of the embodiment, shown in FIGS. 9 and 10 is analogous to that just described, but as the openings between the axial tubes in this case are larger and thus permit a faster rotation of the filter rotor, this circumstance can be utilized optimally as the accumulators reduce the discharge time for filtrate considerably.

Figure 13:
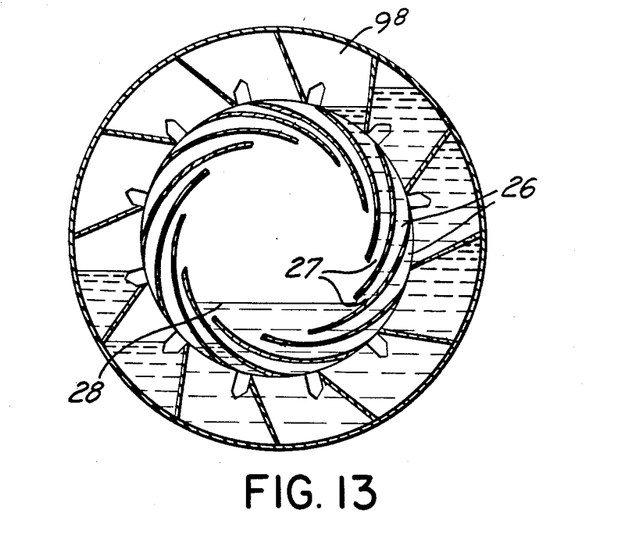
FIG. 13 shows a view in direction XIII—XIII in FIG. 12.

The embodiment shown in FIGS. 12 and 13 operates in the same way as the embodiment just described, with the exception that after the accumulator chamber $9^8$ has been filled with filtrate, the suction leg 26 starts to fill with filtrate. The suction leg is then successively filled completely by filtrate and its opening 27 comes below the liquid surface 28 and on the upgoing side of th filter a subpressure is created in the accumulator chamber, and in the axial tube portions and filter elements communicating with same.

When—during the rotation—the opening 27 of the suction leg leaves the water lock, air will enter backwards through the suction leg, and the subpressure in the filter elements will cease.

Of course other embodiments are conceivable within the scope of the invention. In some cases accumulator chambers can suitably be provided at both ends of the filter rotor, etc. The length of the discharge pipes can also vary, and also discharge pipes of the barometric type are conceivable in some special cases.

For all embodiments shown, it applies that the accumulator chamber permits a higher rotation rate and thus higher capacity. In order to fully utilize this advantage, a new device for removal spraying must be provided.

In filters according to Swedish patent specification No. 7406315-7, one spraying nozzle has been provided in the removal zone on each side of the filter discs, spraying continuously. This known device has proved to give certain problems at higher rates of rotation, as often a large or small amount of pulp has been hanging over the axial tubes. This disturbance could be avoided by providing on each side of the filter elements two spraying nozzles 30 and 31, circumferentially one after the other as is obvious from FIGS. 3 and 9, and by bringing the rear nozzle 30 (seen in the direction of rotation) to operate intermittently and approximately when an axial tube or a group of tubes passes the nozzle, whilst the second nozzle operates continuously. Even better effect can be obtained if the rear nozzle is directed forwards in the direction of rotation (the angle alpha is larger than 0°). The nozzles are shown in a sectional longitudinal view in FIG. 6.

In an alternative embodiment, both the nozzles 30 and 31 spray intermittently and suitably substantially simultaneously. Each time they are operated, part of the filter cake is sprayed away.

The nozzles mentioned above operate normally with water of a high pressure. In those cases when a high concentration of the outgoing pulp is desired, pressurized air is used instead of high pressure water.

Figure 5:
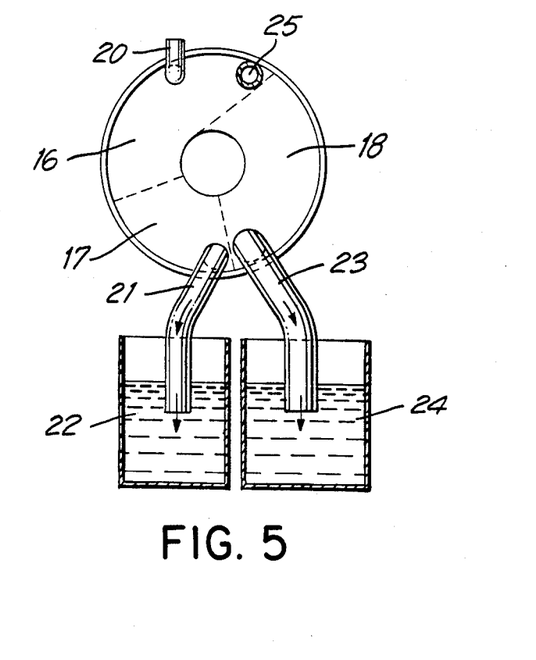
FIG. 5 shows a view of a device for filtrate discharge.

As shown in FIGS. 4 and 5, filtrate discharge device $11^1$ includes stationary wall means $11^2$ separating the zones 16, 17 and 18 from each other. Thus, zone 16 can be maintained at the above-mentioned atmospheric pressure during filling of the accumulator chambers $9^1$ and while zones 17 and 18 are under subatmospheric pressure during discharge of filtrate from these chambers.

As also shown in FIG. 4, each accumulator chamber $9^1$ has means for retaining a static body of filtrate therein as the chamber is being moved from filling zone 16 to discharge zone 17.

I claim;

1. In combination with a rotatable filter assembly intended primarily for separation of fibers from a fiber suspension and including a plurality of annular filter discs each having a plurality of filter elements, a horizontal drum adapted to be driven about an axis and on which said filter discs are mounted in substantially parallel, axially spaced relation to eah other, a container for said fiber suspension and in which said drum is rotatable, each filter element being formed by a hollow body having walls of straining cloth and also having radially inner and outer ends, each said hollow body having a filtrate outlet at its radially inner end, said drum being generally cylindrical and including a series of tubes having axial main portions forming a grating-like mantle wall of the drum, each hollow body communicating through its filtrate outlet with a corresponding said tube forming a discharge tube, and a collecting hopper extending into the drum through an open end thereof and surrounded by said filter discs, said hopper having an upwardly facing entrance opening extending along all of said filter discs, the improvement comprising means defining accumulator chambers in which said main portions of the discharge tubes terminate, said chambers communicating through said main portions with corresponding filter elements, means forming stationary filling zone where each said chamber receives filtrate from a said main portion and all of the received filtrate is retained in the chamber while the chamber is being filled, means forming a stationary discharge zone which receives said retained filtrate from each said chamber after the chamber is displaced from the filling zone as the drum rotates, said zones being adjacent the drum, and stationary wall means separating said zones from each other to allow different respective pressures to be maintained in the zones, said chamber-defining means including walls for retaining in each said chamber, as the chamber moves from the filling to the discharge zone, a static body of filtrate including filtrate first entering said chamber at the filling zone, whereby all of the filtrate received at the filling zone by each chamber is discharged therefrom at the discharge zone, said discharge zone including a discharge device dimensioned to discharge the filtralte content of each filled chamber and corresponding tube main portion.

2. The combination of claim 1, in which the accumulator chambers are located axially beyond the main tube portions.

3. The combination of claim 2, in which the accumulator chambers are located radially substantially outside the main tube portions.

4. The combination of claim 2, in which the accumulator chambers are located radially substantially inside the main tube portions.

5. The combination of claim 2, in which the accumulator chambers are located partly radially inside and partly radially outside the main tube portions.

6. The combination according to claim 1, in which said filtrate discharge device includes at least one discharge chamber located radially inside the accumulator chambers, and a sliding coupling through which the accumulator chambers communicate, one after the other, with said discharge chamber as the drum rotates.

7. The combination of claim 6, in which said filtrate discharge device also includes a filtrate container and a discharge pipe leading from said discharge chamber to said container.

8. The combination according to claim 1, in which said filtrate discharge device includes two discharge chambers located one after the other in the rotation direction of the drum and radially inside the accumulator chambers, a sliding coupling through which the accumulator chambers communicate, one after the other, first with one and then with the other of said discharge chambers as the drum rotates, and a separate discharge pipe leading from each of the discharge chambers.

9. The combination according to claim 1, in which said filtrate discharge device includes a discharge chamber through which filtrate passes while forming a liquid surface, the combination comprising also means forming a plurality of suction channels each communicating with a corresponding one of said accumulator chambers, each suction channel having a free end positioned to open below said liquid surface during part of the drum's revolution, thereby creating a subpressure in the corresponding accumulator chamber, tube and hollow body.

10. The combination according to claim 1, in which said main portions of the tubes, as seen in a sectional view perpendicular to the drum's axis, are arranged in groups of at least two tubes.

11. The combination of claim 10, in which every second tube is circumferentially retracted relative to the other tubes, as seen in the direction of the drum's rotation, so that the tubes form groups of two.

12. The combination of claim 11, in which the total volume of each retracted tube and corresponding hollow body and accumulator chamber is smaller than the total volume of the non-retracted tube grouped with the retracted tube and the corresponding hollow body and accumulator chamber.

13. The combination of claim 10, in which every second tube is circumferentially displaced forward relative to the other tubes, as seen in the direction of the drum's rotation, so that the tubes form groups of two.

14. The combination according to claim 1, comprising also two nozzles located at each side of each filter disc, said two nozzles being spaced from each other circumferentially of the drum and operable to eject high pressure fluid to facilitate removal of fibers from the disc in a removal zone.

15. The combination of claim 14, in which the rear one of said two nozzles, as seen in the direction of the drum's rotation, is operable intermittently, the other nozzle being operable continuously.

16. The combination of claim 14, in which both of said nozzles are operable intermittently.

17. The combination of claim 14, in which the rear one of said two nozzles, as seen in the direction of the drum's rotation, is directed forward in said direction.

18. In the operation of a rotatable filter assembly including a plurality of annular filter discs each having a plurality of filter elements, a horizontal drum adapted to be driven about an axis and on which said filter discs are mounted in substantially parallel, axially spaced relation to each other, a container for a fiber suspension and in which said drum is rotatable, each filter element being a hollow body having walls of straining cloth and also having radially inner and outer ends, each said hollow body having a filtrate outlet at its radially inner end, said drum being generally cylindrical and including a series of discharge tubes having axial main portions forming a grating-like mantle wall of the drum, each said main portion terminating in an accumulator chamber of the discharge tube, each hollow body communicating through its filtrate outlet with a corresponding said discharge tube, and a collecting hopper extending into the drum and surrounded by said filter discs, said hopper having an upwardly facing entrance opening extending along all of said filter discs, the method which comprises rotating the drum to move the accumulator chambers first to a filling zone and then to a discharge zone while separating said from each other, filling each said chamber with filtrate as the chamber passes along the filling zone and while retaining in the chamber all of the filtrate the chamber receives from a said main portion, maintaining in each accumulator chamber, as the chamber moves from the filling zone to the discharge zone, a static body of filtrate including the filtrate first entering said chamber at the filling zone, and discharging from each chamber at said discharge zone all of the filtrate received by said chamber at the filling zone.

19. The method of claim 18, in which said filling zone is subjected to atmospheric pressure for said filling of the chambers.

20. The method of claim 18, which comprises also maintaining a subatmospheric pressure in said discharge zone while independently maintaining a higher pressure in the filling zone.

* * * * *

UNITED STATES PATENT AND TRADEMARK OFFICE
CERTIFICATE OF CORRECTION

PATENT NO. : 4,814,093

DATED : March 21, 1989

INVENTOR(S) : Rune H. Frykhult

It is certified that error appears in the above-identified patent and that said Letters Patent is hereby corrected as shown below:

Col. 1, line 34, change "301082-7" to -- 8301082-7 -- .

Col. 10, line 30, after "said" insert -- zones -- .

Signed and Sealed this

Thirteenth Day of March, 1990

Attest:

JEFFREY M. SAMUELS

*Attesting Officer*       *Acting Commissioner of Patents and Trademarks*